United States Patent
Inoue

(10) Patent No.: US 7,731,871 B2
(45) Date of Patent: Jun. 8, 2010

(54) OPTICAL DISK AND METHOD FOR PRODUCING THE SAME

(75) Inventor: Kazuo Inoue, Suita (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/338,286

(22) Filed: Dec. 18, 2008

(65) Prior Publication Data

US 2009/0102079 A1    Apr. 23, 2009

Related U.S. Application Data

(62) Division of application No. 10/911,665, filed on Aug. 5, 2004, now Pat. No. 7,488,436.

(30) Foreign Application Priority Data

Aug. 5, 2003    (JP)    ............................ 2003-286652

(51) Int. Cl.
  *B29D 11/00*    (2006.01)
  *B29D 17/00*    (2006.01)
  *G11B 5/66*    (2006.01)

(52) U.S. Cl. ...................... 264/1.33; 264/107; 264/135; 264/219; 425/810

(58) Field of Classification Search ................ 264/1.33, 264/133, 1.37, 106, 107, 135, 219, 220, 227; 425/193, 385, 112, 129.1, 810, 394, 470
See application file for complete search history.

(56) References Cited

U.S. PATENT DOCUMENTS

| | | | |
|---|---|---|---|
| 4,472,124 A * | 9/1984 | Kashihara et al. ............... | 425/3 |
| 4,613,949 A | 9/1986 | Glover et al. | |
| 4,659,407 A * | 4/1987 | Lacotte et al. ............... | 156/196 |
| 5,009,818 A * | 4/1991 | Arai et al. ................... | 264/1.33 |
| 5,141,785 A * | 8/1992 | Yoshinada et al. ............ | 428/1.3 |
| 5,688,447 A * | 11/1997 | Hong ......................... | 264/1.33 |
| 5,827,593 A * | 10/1998 | Maruyama et al. .......... | 428/64.1 |

(Continued)

FOREIGN PATENT DOCUMENTS

JP    60-242352    12/1985

(Continued)

OTHER PUBLICATIONS

Yamamoto, O., "Large-capacity optical disk with one side surface having a capacity of 12 Gbyte", vol. 20, No. 2, pp. 184-185, 1998.

(Continued)

*Primary Examiner*—Joseph S Del Sole
*Assistant Examiner*—Nahida Sultana
(74) *Attorney, Agent, or Firm*—Wenderoth, Lind & Ponack, L.L.P.

(57) ABSTRACT

An optical disk is constructed such that a thin film including a reflective layer is formed on a substrate, or on a thermoplastic resin layer on the substrate. A stamper having an asperity pattern corresponding to information signals is directly pressed against the thin film to transfer the asperity pattern on the thin film. Heat-pressing the stamper against the thin film makes it possible to further accurately transfer the asperity of the stamper to the reflective layer with less pressing force in the case where the reflective layer is formed on a thermoplastic resin layer.

11 Claims, 8 Drawing Sheets

U.S. PATENT DOCUMENTS

| | | | | |
|---|---|---|---|---|
| 6,004,420 | A | * | 12/1999 | Nakamura et al. .......... 156/249 |
| 6,023,451 | A | * | 2/2000 | Kashiwagi et al. ....... 369/275.5 |
| 6,207,089 | B1 | * | 3/2001 | Chuang ...................... 264/135 |
| 6,440,333 | B2 | * | 8/2002 | Masuhara .................. 264/1.33 |
| 6,468,620 | B2 | * | 10/2002 | Waki et al. ................. 428/64.1 |
| 6,703,100 | B2 | * | 3/2004 | Arakawa et al. ........... 428/64.2 |
| 6,743,320 | B2 | | 6/2004 | Hisada et al. .............. 156/233 |
| 6,869,655 | B1 | * | 3/2005 | Ono et al. .................. 428/64.1 |

FOREIGN PATENT DOCUMENTS

| | | | |
|---|---|---|---|
| JP | 61197213 | * | 9/1986 |
| JP | 62-065248 | | 3/1987 |
| JP | 62-201215 | | 9/1987 |
| JP | H1-138636 | | 5/1989 |
| JP | 8-17076 | | 1/1996 |
| JP | 8-17076 A | * | 1/1996 |
| JP | H8-124224 | | 5/1996 |
| JP | 10-199050 | | 7/1998 |
| JP | 2001-273676 | | 10/2001 |
| JP | 2002-237105 | | 8/2002 |

OTHER PUBLICATIONS

U.S. Office Action issued Mar. 4, 2008 in U.S. Appl. No. 10/911,665.
U.S. Office Action issued May 29, 2008 in U.S. Appl. No. 10/911,665.
U.S. Notice of Allowance issued Oct. 31, 2008 in U.S. Appl. No. 10/911,665.
Notice of Reasons for Rejection issued Aug. 18, 2009 in corresponding Japanese Application No. 2004-220288 w/English translation.

* cited by examiner

OPTICAL DISK AND METHOD FOR PRODUCING THE SAME

This application is a divisional of application Ser. No. 10/911,665, filed Aug. 5, 2004 now U.S. Pat. NO. 7,488,436.

BACKGROUND OF THE INVENTION

1. Field of the Invention

The present invention relates to a method for producing optical disks by transferring an asperity pattern formed on a stamper, and optical disks produced by the method.

2. Description of the Related Art

In recent years, technologies of recording still image information and moving image information, as well as character information in media have been developed. Among such technologies, optical disks operated such that laser light is irradiated onto a disk plane to detect the reflected light, and data is read based on the detected reflected light have been widely used for the features of a large recording capacity and long-term storage.

DVDs (Digital Versatile Discs), which are optical disks of a large recording capacity, have been standardized, and the DVDs each having a size 120 mm in diameter, with one side surface having a capacity of 4.7 GB are commercially available. A technique has been proposed to attain further high-density recording, for example, in "Large-capacity optical disk with one side surface having a capacity of 12 Gbyte" written by Yamamoto, O plus E, 20 (No. 2), pp. 183-186 (1998). The article recites that the proposed optical disk has a light-transmissive protective layer of 0.1 mm in thickness, and that the optical disk comprises a thick substrate to secure rigidity of the disk.

There are two proposed ways to increase the recording capacity: one is use of laser light of a shorter wavelength, and the other is use of an object lens having a larger numerical aperture. Use of an object lens having a larger numerical aperture has merits in that the spot of irradiated laser light is decreased, and accordingly, high-density recording is achievable. This technology, however, has demerits in that the focal length may be shortened, and that data reading may be greatly affected by tilting of a light incident plane of the disk relative to the optical axis. In view of these drawbacks, it is required to reduce the thickness of the light-transmissive layer (protective layer) corresponding to the light incident plane.

There is, however, a limit regarding the technology of reducing the thickness of a substrate formed by injection molding. Accordingly, an increase of recording capacity by injection molding is difficult. There has been developed production of optical disks constructed such that a light-transmissive layer capable of transmitting laser light is formed on a substrate, and laser light is irradiated onto a metallic thin film (reflective layer) via the light-transmissive layer. There is defined a recording capacity standard ranging from 23 GB to 27 GB for one side surface regarding Blu-ray disks, which is the next-generation optical disks proposed at present.

Another method for fabricating optical disks is proposed in Japanese Unexamined Patent Publication No. HEI 8-124224, for instance. The publication discloses a method of forming a thermoplastic resin layer on a flat resin base, and heat-pressing a stamper having an asperity pattern against the thermoplastic resin layer. Japanese Unexamined Patent Publication No. HEI 1-138636 discloses a method of forming, on a thin film, a layer made of a UV curing resin, an electron beam curing resin, or a thermosetting resin, and pressing a stamper against the resin layer.

FIGS. 8A through 8D schematically show the process of fabricating optical disks according to the method disclosed in Japanese Unexamined Patent Publication No. HEI 8-124224. Referring to FIG. 8A, a thermoplastic resin layer 102 is formed on a substrate 101. When the surface of the thermoplastic resin layer 102 is heat-pressed against a stamper 103 having an asperity pattern, as shown in FIG. 8B, the asperity pattern of the stamper 103 is transferred to the thermoplastic resin layer 102. Thereafter, as shown in FIG. 8C, a metallic thin film 104 or an equivalent layer, as a reflective layer, is deposited on the thermoplastic resin layer 102 by vacuum deposition, for instance. Lastly, as shown in FIG. 8D, a protective layer 105 is formed on the metallic thin film 104, thus fabricating an optical disk.

As mentioned above, it is required to reduce the thickness of the protective layer 105 in order to increase the recording density of the optical disk. There is another requirement that a thick substrate such as the substrate 101 be bonded in order to secure rigidity as the disk.

The method disclosed in Japanese Unexamined Patent Publication No. HEI 8-124224 comprises heat-pressing the stamper 103 having an asperity pattern against the thermoplastic resin layer 102 formed on the substrate 101, followed by depositing the metallic thin film 104 on the thermoplastic resin layer 102. Forming the metallic thin film 104 after forming the asperity pattern on the thermoplastic resin layer 102 may make it difficult to coincide the asperity patterns on the upper and lower surfaces of the reflective layer 104 with each other. Specifically, whereas the asperity pattern on the lower surface of the metal thin layer 104 facing the thermoplastic resin layer 102 precisely matches with the asperity pattern on the thermoplastic resin layer 102, the asperity pattern on the upper surface of the metal thin layer 104 does not match with the asperity pattern on the thermoplastic resin layer 102 in such a manner that a corner defined by a land and an adjacent groove has a substantially round shape, as shown in FIG. 8C. As a result, when laser light is incident on the metallic thin film 104 from above in the plane of FIG. 8D, unnecessary diffuse reflection is generated due to the round corners of the asperity pattern. In the case where the recording density is low, influence of such diffuse reflection is negligible. However, as the recording density is increased, such diffuse reflection gives adverse effect to signals, which may likely to cause errors in reading.

As a measure to prevent such a drawback, there is proposed an idea of forming an asperity pattern on the protective layer 105 serving as a laser light incident plane, and depositing the metallic thin film 104 on the protective layer 105 having the asperity pattern. However, it is practically impossible, according to the current standard of technology, to manufacture the protective layer 105 having a thickness of 0.1 mm and having an asperity pattern by injection molding as employed in manufacturing the substrate 101. In view of this, there is proposed a method, on the basis of the technology disclosed in Japanese Unexamined Patent Publication No. HEI 8-124224, of coating a thermoplastic resin on a thin sheet to make the thickness of the resin-coated sheet of about 0.1 mm, and heat-pressing a stamper against the resin-coated sheet. This method, however, has a drawback that since the rigidity of the resin-coated sheet is low due to its very small thickness, the degree of heat shrinkage may vary locally owing to non-uniform temperature distribution during the heating. As a result, crinkling may appear over the entirety of the sheet. Likewise, crinkling resulting from shrinkage appears on the optical disks produced by the method as disclosed in Japanese Unexamined Patent Publication No. HEI 1-138636, which comprises the steps of forming a layer of a UV curing resin, a electron beam curing resin, or a thermosetting resin on the sheet, and pressing the stamper against the resin-coated sheet. Furthermore, adhesiveness between the sheet and the resin is weak in the disks produced by the method disclosed in Japanese Unexamined Patent Publication No. HEI 1-138636.

SUMMARY OF THE INVENTION

In view of the above, it is an object of the present invention to provide a mass-producible, crinkling-free or layer-peeling-free optical disk production method in which signals are not affected by an influence such as the thickness of a metallic thin film, and optical disks produced by the method.

According to an aspect of the present invention, a method is provided for producing optical disks constructed such that laser light is irradiated on a side of the disk opposite to a substrate in information reading. The method comprises the steps in the order of forming, on the substrate, a thin film including at least a reflective metal layer; and directly and pressing a stamper having an asperity pattern on a side thereof facing the thin film, against the thin film to transfer the asperity pattern to the reflective metal layer.

In the above arrangement, since the stamper is directly and pressed against the thin film, the asperity pattern of the stamper is accurately transferred to the reflective metal layer. This arrangement enables accurate signal reading. Also, since the optimum asperity configuration of the disk can be determined based on the asperity pattern of the stamper, signal optimization is easy.

According to another aspect of the present invention, a method is provided for producing optical disks constructed such that laser light is irradiated on a side of the disk opposite to a substrate in information reading. The method comprises the steps in the order of directly and firmly contacting a stamper with a sheet member including at least a reflective metal layer, the stamper being formed with an asperity pattern on a side thereof facing the reflective metal layer, and being fixedly supported in a die assembly; and forming a substrate by injecting a molten resin into a cavity of the die assembly.

In the above arrangement, the surface of the stamper having the asperity pattern is directly and firmly contacted with the sheet member including at least the reflective metal layer. The substrate is formed by injecting the molten resin into the cavity of the die assembly from the side opposite to the reflective metal layer. At the time of the injection molding, the stamper, the sheet member including the reflective metal layer, and the substrate are pressed against each other in the die assembly. As a result of the press-contact, the asperity pattern of the stamper is accurately transferred to the reflective metal layer by press-contact with the surface of the stamper having the asperity pattern.

According to yet another aspect of the present invention, an optical disk is provided comprising a thin film, wherein a radius of curvature of an edge portion of an asperity formed on a plane of the thin film on which laser light is irradiated is smaller than a radius of curvature of an edge portion of an asperity formed on a plane of the thin film opposite to the light incident plane.

In the above arrangement, the radius of curvature of the edge portion of the asperity formed on the light incident plane of the thin film is smaller than the radius of curvature of the edge portion of the asperity formed on the other plane of the thin film. Namely, the asperity on the light incident plane of the thin film has a sharper edge portion than that on the other plane of the thin film. This arrangement makes it possible to carry out accurate signal reading.

These and other objects, features and advantages of the present invention will become more apparent upon reading of the following detailed description along with the accompanying drawings.

DETAILED DESCRIPTION OF THE PREFERRED EMBODIMENTS

Figure 1A:
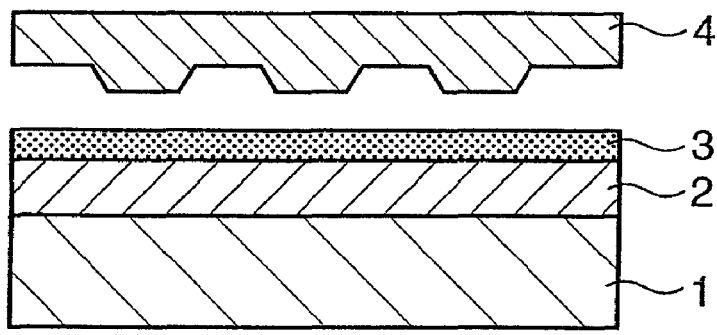
FIGS. 1A through 1C are illustrations schematically showing an optical disk production method in accordance with a first embodiment of the present invention.

In the following, preferred embodiments of an optical disk production method in accordance with the present invention are described referring to the drawings. The configuration and the size of the optical disk is optionally determined depending on the purpose of use of the optical disk. In the case where the optical disk is a DVD, the DVD is in the form of a disk of 120 mm in diameter, with a hole of 15 mm in diameter in a central part thereof. Generally, the DVD has a thickness of about 1.2 mm.

First Embodiment

Figure 1B:
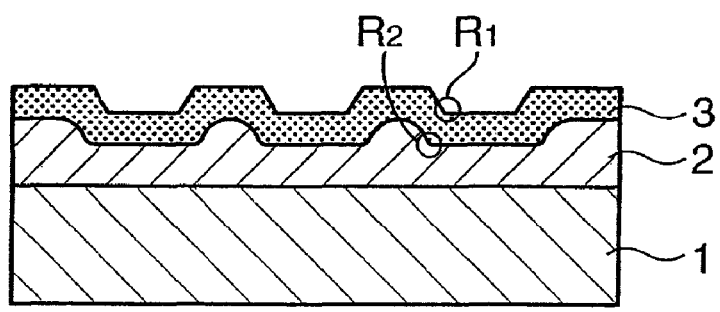
Figure 1C:
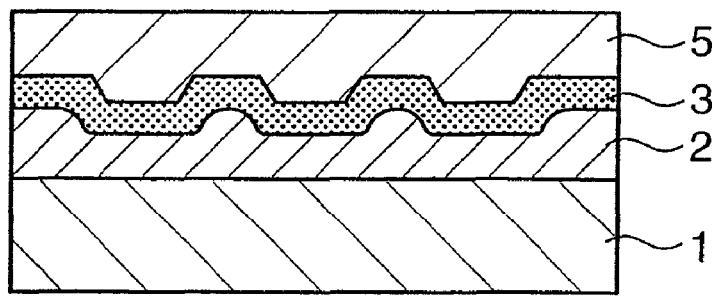

FIGS. 1A through 1C are illustrations showing a process of an optical disk production method in accordance with a first embodiment of the present invention.

Referring to FIG. 1A, a thermoplastic resin layer 2 in the form of an acrylic resin film (softening temperature of 90° C.) and having a thickness of 50 μm is bonded to a substrate 1 made of a polycarbonate resin (softening temperature of 140° C.) and having a thickness of 1.1 mm by an adhesive. Next, a thin film 3 made of silver (Ag) and having a thickness of 50 nm is deposited on the thermoplastic resin layer 2 by sputtering. An asperity pattern of a stamper 4 corresponding to information signals has a configuration such that the track pitch is 0.35 μm, and the asperity pit has a height or depth of 70 nm. The stamper 4 is mounted on a press machine, and the substrate 1 formed with the thermoplastic resin layer 2 and the thin film 3 is mounted in a state that the substrate 1 is disposed opposite to the side where the stamper 4 is mounted. Subsequently, the stamper 4 is heated to such a temperature as to cause plastic deformation of the thermoplastic resin 2. In the above arrangement, the softening temperatures of the substrate 1 and the thermoplastic resin 2 are respectively about 140° C. and about 90° C. In view of this, it is desirable to set the temperature of the stamper 4 so as not to exceed a temperature that may deform the thermoplastic resin layer 2 but does not deform the substrate 1, namely, in the range from 100 to 130° C. inclusive. In this embodiment, the heated temperature of the stamper 4 is 120° C.

When the stamper 4 is heated to the predetermined temperature, the substrate 1 is turned to its original shape after temporarily being subjected to elastic deformation. On the other hand, when the stamper 4 reaches the predetermined temperature, the thermoplastic resin layer 2 is plastically deformed. In this state, the stamper 4 is pressing against the thin film 3 with a surface pressure of 50 MPa. At this time, it is desirable to apply vacuum attraction to a clearance defined by the thin film 3 and the stamper 4 to keep air bubbles from intruding in the clearance. This arrangement prevents gas intrusion to thereby effectively carry out the pressing. As a result of the pressing, as shown in FIG. 1B, the asperity pattern of the stamper 4 is accurately transferred onto the thin film 3, and simultaneously, the thermoplastic resin layer 2, as well as the thin film 3, is plastically deformed.

Subsequently, a protective layer 5 is placed on the thin film 3, as shown in FIG. 1C, whereby an optical disk is fabricated. The protective layer 5 protects the asperity formed on the metallic thin layer 3. Further, since the asperity pattern on the thin film 3 is read through the protective layer 5, the protective layer 5 is required to have a property that does not impede transmission of laser light. In view of this, in this embodiment, the protective layer 5 is formed by coating with a UV curing resin and subjecting the coated resin to UV irradiation after spin-coating to cure the resin. The thickness of the resultant protective layer 5 is about 0.1 mm. Alternatively, it may be possible to bond a transparent sheet made of a polycarbonate resin or a like material to the thin film 3 by an adhesive, in place of forming the protective layer 5.

The thermoplastic resin layer 2 is made of a resin that is plastically deformed when experiencing a certain external force at a temperature of not lower than the softening temperature thereof. The thermoplastic resin is selected from the group consisting of acrylic resins, polycarbonate resins, polyolefin resins, and their equivalents. The thickness of the thermoplastic resin layer 2 preferably ranges from 20 μm to 100 μm inclusive, and more preferably 50 μm.

It is desirable to set the softening temperature of the thermoplastic resin layer 2 lower than the softening temperature of the substrate 1 in the case where the thermoplastic resin layer 2 is formed on the substrate 1. This arrangement is advantageous in securing the flatness of the substrate 1 because the thermoplastic resin layer 2 is plastically deformed without plastic deformation of the substrate 1 when the stamper 4 is heat-pressed against the thermoplastic resin layer 2.

In the case where the optical disk to be produced is a DVD of reproducible type (DVD-ROM), the thin film 3 consists of a reflective metal layer. In the case where the optical disk to be produced is a DVD of recordable or rewritable type (DVD-RAM), the thin film 3 comprises multiple layers including a recording layer and a reflective metal layer. In the case where the optical disk is of a reproducible type, as described in this embodiment, it is desirable to use a metal having high ductility in light of the arrangement that the asperity pattern of the stamper 4 is directly transferred onto the thin film 3. Examples of metal elements having such a property include gold (Au), copper (Cu), platinum (Pt), and aluminum (AD, as well as silver (Ag) used in this embodiment. Alternatively, the material of the thin film 3 may be an alloy containing at least one of the above metals, in place of the aforementioned single metal. In this embodiment, the thin film 3 contains at least one selected from Au, Ag, Cu, Pt, and Al, preferably, in the content of 95 wt % or more, more preferably, 97 wt % or more, and furthermore preferably, 98 wt % or more. The reason for setting such a value as the metal content of the thin film 3 is that containing a material other than the metal in the content of 5 wt % or more may greatly lower the ductility of the thin film 3 or excessively increase the rigidity of the thin film 3. The requirements regarding the thin film in the second through fourth embodiments of the present invention are the same as those in this embodiment.

The stamper 4 has an asperity pattern corresponding to information signals, and is adapted to transfer the asperity pattern to the thin film 3 when being pressed against the thin film 3. The stamper 4 is made of nickel (Ni), for instance. The asperity pattern of the stamper 4 is generally formed by a photoresist method or a like technique.

An exemplified method of forming the thermoplastic resin layer 2 on the substrate 1 comprises, as described in this embodiment, placing a sheet made of a thermoplastic resin on the substrate 1, and bonding the resin sheet to the substrate 1 by an adhesive. Another method comprises placing a sheet made of a thermoplastic resin on the substrate 1, followed by co-extrusion and laminating. Both of the methods are desirable because these methods are effective in keeping air bubbles from intruding in the clearance between the substrate 1 and the thermoplastic resin layer 2, and in suppressing contact failure. The thermoplastic resin layer 2 may be formed on the thin film 3 by a vacuum deposition method other than sputtering.

Figure 2:
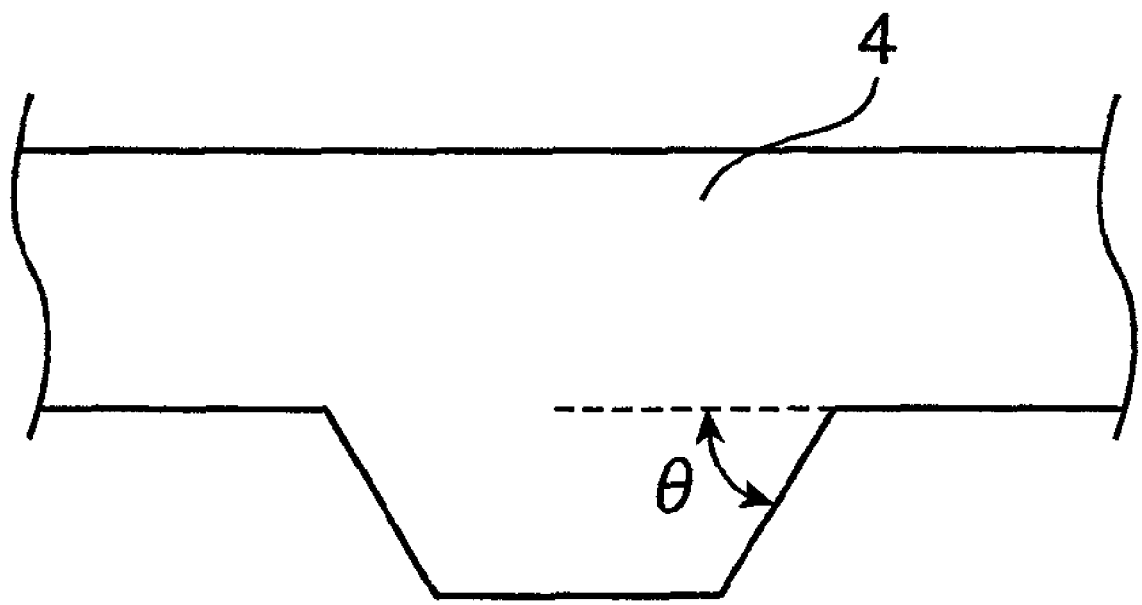
FIG. 2 is a cross-sectional view of a stamper to explain an angle of asperity in the first embodiment of the present invention.

Next, transfer characteristics of the optical disks were examined by changing the angle of asperity surface of the stamper 4 while keeping the above conditions unchanged. Here, as shown in FIG. 2, the "angle of asperity" is represented by the angle θ (=0 to 90 degrees), which is defined by the slope of a protrusion of the asperity and a bottom flat plane of the stamper 4 without any protrusions. Specifically, the angle of asperity with respect to the flat plane is: θ=0 degree, whereas the angle of asperity with respect to a plane orthogonal to the flat plane is: θ=90 degrees. It is verified that as long as the angle of asperity is 70 degrees or less, the asperity pattern of the stamper 4 is accurately transferred to the thin film 3. In other words, if the angle of asperity sof the stamper 4 is 70 degrees or less, the angle of asperity of the stamper 4 substantially coincides with the angle of asperity that has been transferred to the thin film 3. More specifically, if the angle of asperity of the stamper 4 exceeds 70 degrees, such as 80 degrees or 90 degrees, transferability to the thin film 3 is degraded. On the other hand, if the angle θ of asperity of the stamper 4 is equal to or less than 70 degrees, e.g., 50 degrees or 60 degrees, good transferability is obtained, with the result that the angles of the asperity surfaces of the stamper 4 and the thin film 3 are substantially coincident with each other.

Furthermore, the cross sections of the produced optical disks were observed with use of a transmission electron microscope (TEM). The results of the observation reveal that the thicknesses of the cross sections of the asperity surface on the thin film 3 are substantially identical to each other radially and circumferentially. Namely, a substantially isotropic pressure has been exerted to the thin film 3 by press-contact with the stamper 4.

In addition to the above, states of an edge portion of an asperity pit (groove) on the upper surface of the thin film 3 which has been pressed against the stamper 4, and an edge portion of a corresponding asperity pit on the lower surface of the thin film 3 which has been pressed against the thermoplastic resin layer 2 were examined. The observation results reveal that the radius of curvature of the edge portion in contact with the stamper 4 is significantly smaller than the radius of curvature of the edge portion in contact with the thermoplastic resin layer 2, which proves that a desirable edge portion is formed on the thin film 3. Here, as shown in FIG. 1B, let us assume that the radius of curvature of the edge portion in contact with the stamper 4 is $R_1$, and the radius of curvature of the edge portion in contact with the thermoplastic resin layer 2 is $R_2$, then, $R_1$ and $R_2$ preferably satisfy a relation: $R_2/R_1 > 1.0$, more preferably, $R_2/R_1 > 1.5$, and further more preferably, $R_2/R_1 > 2.0$.

Figure 3:
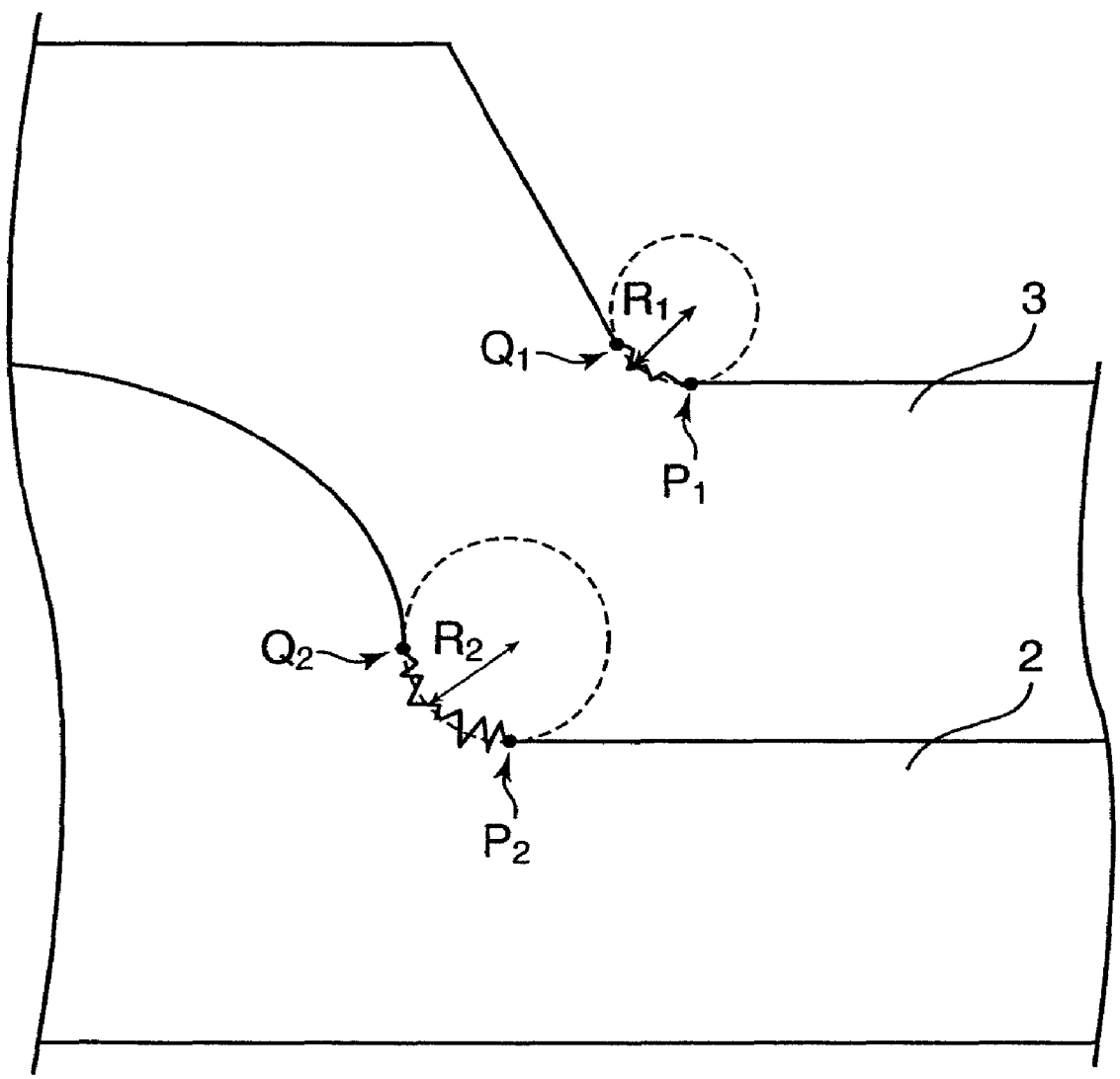
FIG. 3 is a cross-sectional view of an optical disk to explain radii of curvature of edge portions on the upper and lower surfaces of a thin film in the first embodiment of the present invention.

As a matter of fact, however, it is less likely that the edge portion constitutes a continuous plane, and, in most of the cases, the edge portion has an asperity. FIG. 3 is a partially enlarged view of FIG. 1B to explain this matter. In the case where the edge portion does not constitute a smooth plane, namely, has an asperity, let us draw a circle with a circular arc which approximately represents the asperity, as shown by the dotted lines in FIG. 3. For instance, let it be assumed that a point of the edge portion on the upper surface of the thin film 3 which intersects with a line extending from a bottom plane of an asperity pit (groove) in the upper surface of the thin film 3 is $P_1$, and a point of the edge portion which intersects with a line extending from the slope of a protrusion on the upper surface of the thin film 3 is $Q_1$. Then, an circle is drawn according to a least square or a like mathematical method by using the two points as fixed points in such a manner that the difference between the circle and the asperity is smaller than a certain value. The radius of the circle drawn in the above manner is $R_1$. Similarly, let it be assumed that a point of the edge portion on the lower surface of the thin film 3 which intersects with a thermally non-deformed lower surface of the thin film 3 is $P_2$, and a point of the edge portion which intersects with a line extending from the slope of a protrusion of the thermoplastic resin layer 2 is $Q_2$. Then, the radius of an approximate circle drawn by using these two points as fixed points is $R_2$.

As mentioned above, the asperity pattern formed on the thin film 3 matches the asperity pattern of the stamper 4. With this arrangement, signals are read accurately without causing unnecessary diffuse reflection of laser light incident from the side of the protective layer 5. Generally, as the thickness of a metallic thin film is increased, the asperity pattern on the upper surface of the metallic thin film does not exactly coincide with the asperity pattern of the layer underneath the metallic thin film, as seen in the conventional art. According to this embodiment of the present invention, however, since the asperity pattern is transferred after formation of the thin film 3, there is no likelihood that a thick metallic film obstructs formation of an asperity pattern having a sharp edge portion. This arrangement enables to determine an optimum asperity configuration depending on the asperity pattern of the stamper 4 to thereby facilitate signal optimization.

In this embodiment, the substrate 1 on which the thermoplastic resin layer 2 is formed is made of a polycarbonate resin, with a thickness of 1.1 mm. This arrangement secures high rigidity for the substrate 1. Furthermore, the heated stamper 4 is pressed against the thermoplastic resin layer 2 via the thin film 3 having a heat conductivity higher than that of the thermoplastic resin layer 2, instead of directly pressing against the thermoplastic resin layer 2. The high rigidity of the substrate 1, and uniform temperature distribution over the plane of the thin film 3 suppress generation of crinkling of the thermoplastic resin layer 2.

In this embodiment, the thermoplastic resin layer 2 is formed on the substrate 1. Alternatively, the thermoplastic resin layer 2 may be omitted, and the substrate 1 may be made of a thermoplastic resin. Generally, the thermoplastic resin has a low heat conductivity. Therefore, if the substrate 1 is made of a thermoplastic resin, merely the surface layer of the substrate 1 facing the stamper 4 is heated above the softening temperature of the thermoplastic resin, even if the stamper 4 is heated to a temperature exceeding the softening temperature of the thermoplastic resin constituting the substrate 1, and the heated stamper 4 is pressingly contacted with the thin film 3. Thus, omission of the thermoplastic resin layer 2 does not deprive the substrate 1 of flatness over its entirety.

In this embodiment, the thermoplastic resin layer 2 is made of an acrylic resin having a softening temperature of 90° C. in order to keep the heated temperature of the stamper 4 relatively low. As an altered form, a polycarbonate resin having a softening temperature of 140° C., a polyolefin resin having a softening temperature of 120° C., or a like material may be used as the material for the thermoplastic resin layer 2. It is desirable, however, that the substrate 1 does not cause thermal deformation when heated to the softening temperature of the resin used as the material of the thermoplastic resin layer 2. As far as the material satisfies this requirement, any material such as a resin other than the polycarbonate resin used in this embodiment, glass, or a metal may be usable as the material for the substrate 1.

In this embodiment, the heated temperature of the stamper 4 is set to a temperature of not lower than the softening temperature of the thermoplastic resin layer, and of not higher than the softening temperature of the substrate 1. The heated temperature of the stamper 4 is not limited to the above range, and may be lower than the softening temperature of the thermoplastic resin layer 2. Primary factors of causing plastic deformation of the thermoplastic resin layer 2 are temperature and pressure. Accordingly, even if the heated temperature of the stamper 4 is slightly lower than the softening temperature of the thermoplastic resin layer 2, raising the surface pressure of the stamper 4 by such a level as to compensate for such a temperature lowering enables to allow the stamper 4 to efficiently transfer the asperity pattern thereof.

In this embodiment, described is the case where the thin film 3 consists of the reflective metal layer. An altered arrangement is applicable in which the thin film 3 is a multiple layers including a recording layer and a reflective metal layer, and the stamper 4 is not pressingly contacted with the reflective metal layer. Such an altered arrangement also makes it possible to accomplish uniform temperature distribution over the plane of the thin film 3, secure high rigidity for the substrate 1, and suppress generation of crinkling of the thermoplastic resin layer 2, because heat is transferred at a high rate over the plane of the reflective metal layer due to a small distance between the stamper 4 and the reflective metal layer having a high heat conductivity.

Second Embodiment

In the first embodiment, the stamper 4 is heated to a temperature of not lower than the softening temperature of the thermoplastic resin layer 2, and the heated stamper 4 is pressed against the thin film 3 to such an extent as to deform the thermoplastic resin layer 2, as well as the thin film 3, thereby transferring the asperity pattern of the stamper 4 to the thin film 3. In the second embodiment, a case is described where a thermoplastic resin layer 2 is omitted, and a thin film 3 is directly subjected to plastic deformation on a substrate 1.

Figure 4A:
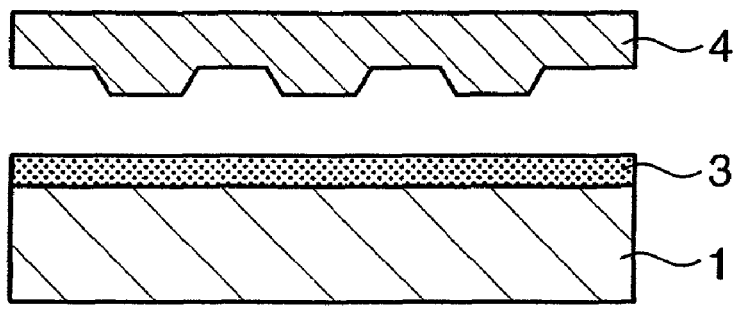
FIGS. 4A through 4C are illustrations schematically showing an optical disk production method in accordance with a second embodiment of the present invention.
Figure 4B:
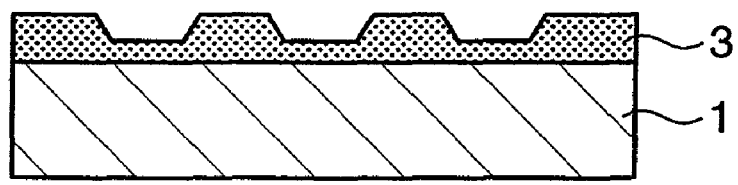
Figure 4C:
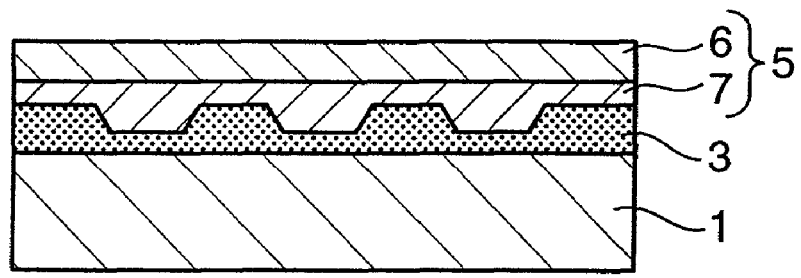

FIGS. 4A through 4C are illustrations showing an optical disk production method in accordance with the second embodiment of the present invention. It should be noted that elements in the second through fourth embodiments which are equivalent to those in the first embodiment are denoted with the same reference numerals.

Referring to FIG. 4A, a thin film 3 made of silver and having a thickness of 200 nm is deposited on a substrate 1 made of a polycarbonate resin and having a thickness of 1.1 mm by sputtering. An asperity pattern of a stamper 4 corresponding to information signals has a configuration such that the track pitch is 0.35 μm, and the asperity pit has a height or depth of 70 nm. A stamper 4 is mounted on a press machine, and the substrate 1 formed with the thin film 3 is mounted in a state that the substrate 1 is disposed opposite to the side where the stamper 4 is mounted. In the first embodiment, the stamper 4 is heated to a temperature of not lower than the softening temperature of the thermoplastic resin layer 2. In this embodiment, however, the heating step is not necessary.

In this embodiment, tests were run by maintaining the temperatures of the stamper 4, and the substrate 1 formed with the thin film 3 at 25° C., respectively. The stamper 4 was pressed against the thin film 3 with a surface pressure of 100 MPa in this condition. At this time, it is desirable to apply vacuum attraction to a clearance defined by the thin film 3 and the stamper 4 to keep air bubbles from intruding in the clearance. This arrangement prevents gas intrusion to thereby effectively carry out the pressing. When the stamper 4 is pressed against the thin film 3, as shown in FIG. 4B, the asperity pattern of the stamper 4 is accurately transferred onto the thin film 3. Then, a protective layer 5 is placed on the thin film 3, as shown in FIG. 4C, whereby an optical disk is fabricated. The protective layer 5 is constituted of a transparent sheet 6 made of a polycarbonate resin, and an adhesive 7. The transparent sheet 6 is bonded to the thin film 3 by the adhesive 7. The adhesive 7 may be a UV curing resin or an adhesive resin. The thickness of the resultant protective layer 5 is about 0.1 mm.

The requirements regarding the substrate 1 and the thin film 3 in the second embodiment are identical to those in the first embodiment. The thin film 3 may be made of any material other than silver, as long as the material has high ductility. The requirements regarding the thin film 3 in this embodiment are the same as those in the first embodiment.

Since the thermoplastic resin layer 2 is omitted in this embodiment, there is no need of heating the stamper 4 to a temperature of not lower than the softening temperature of the thermoplastic resin layer 2. Thus, as far as the temperature of the stamper 4 lies in such a temperature zone as to keep transfer characteristics of the stamper 4 constant, optical disks having good transferability are producible.

Next, in the above arrangement, transfer characteristics of the optical disks were examined by gradually reducing the thickness of the thin film 3 made of silver. Specifically, tests were run in which the stamper 4 was pressed against the thin film 3 with a surface pressure of 100 MPa while setting the thicknesses of the thin film 3 to 50 nm, 100 nm, and 150 nm, respectively. The experiment's results reveal that the asperity pattern of the stamper 4 is accurately transferred onto the thin film 3 in all the cases. Further, transfer characteristics were examined by changing the angle of asperity of the stamper 4 while retaining the other conditions unchanged. The experiment results reveal that the angles of asperity s of the stamper 4 and the thin film 3 are substantially coincident with each other in the case where the angle of asperity of the stamper 4 is 70 degrees or less. Thus, the asperity pattern is accurately transferred.

Furthermore, the cross sections of the produced optical disks were observed with use of a transmission electron microscope (TEM), wherein the thin film 3 had a thickness of 50 nm. Although the drawings of FIGS. 4A through 4C do not clearly illustrate, the upper surface of the substrate 1 (and the lower surface of the thin film 3) are slightly plastically deformed. The results of the observation reveal that the thicknesses of the cross sections of the asperity surface on the thin film 3 are substantially identical to each other radially and circumferentially. Namely, a substantially isotropic pressure has been exerted to the thin film 3 by press-contact with the stamper 4. Further, the optical disks produced by the method in accordance with the second embodiment exhibit substantially the same property as in the first embodiment. Namely, the observation results reveal that the radius of curvature of the edge portion in contact with the stamper 4 is significantly smaller than the radius of curvature of the edge portion in contact with the substrate 1, which proves that a desirable edge portion is formed on the thin film 3. Here, let us assume that the radius of curvature of the edge portion of the thin film 3 in contact with the stamper 4 is $R_1$, and the radius of curvature of the edge portion of the thin film 3 in contact with the substrate 1 is $R_2$, then, $R_1$ and $R_2$ preferably satisfy a relation: $R_2/R_1>1.0$, more preferably, $R_2/R_1>1.5$, and further more preferably, $R_2/R_1>2.0$. Further, the experiment's results reveal that when the thickness of the thin film 3 exceeds 100 nm, plastic deformation of the substrate 1 is gradually reduced.

Subsequently, transfer characteristics of the optical disks were examined by using glass as the material of the substrate 1, while retaining the other conditions unchanged. Specifically, the stamper 4 was pressed against the thin film 3 with a surface pressure of 100 MPa while setting the thicknesses of the thin film 3 made of silver to 100 nm, 150 nm, and 200 nm. The experiment's results reveal that transferability of the asperity pit is insufficient when the thicknesses of the thin film 3 are 100 nm and 150 nm, and that sufficient transferability is obtained only when the thickness of the thin film 3 is 200 nm. This results from the fact that the glass substrate 1 has high rigidity, and is hardly deformed. In other words, merely the thin film 3 is subjected to plastic deformation, and deformation of the thin film 3 is suppressed despite the asperity height of 70 nm of the stamper 4. In view of this, if the rigidity of the substrate 1 is high, it is necessary to set the thickness of the thin film 3 substantially three times as large as the height or depth of the asperity of the stamper 4, or larger.

As mentioned above, transfer characteristics of the optical disks have been described in the cases where the substrates 1 are made of a thermoplastic resin and glass. Alternatively, the substrate 1 may be made of a resin other than the above resin, or a metal. Accordingly, in the case where the substrate 1 is made of a metal, the asperity pattern of the stamper 4 is accurately transferred, as long as the thickness of the thin film 3 made of silver is 200 nm or more.

Next, transfer characteristics of the optical disks were examined in the case where the thin film 3 comprises multiple layers including a recording layer and a reflective metal layer. The thin film 3 comprises: a reflective layer of 100 nm in thickness and made of silver; a transparent film of 100 nm in thickness and made of silicon oxide and zinc sulfide; a recording layer of 20 nm in thickness and made of germanium, tellurium, and antimony; and a transparent film of 50 nm in thickness and made of silicon oxide and zinc sulfide, in this order from the side where the substrate 1 is formed. Similarly to the first embodiment, the asperity pattern of the stamper 4 has a configuration such that the track pitch is 0.35 μm, and the asperity pit has a height or depth of 70 nm. The temperatures of the stamper 4, and the substrate 1 formed with the thin film 3 were maintained at 25° C. The stamper 4 was pressed against the thin film 3 with a surface pressure of 150 MPa in this condition. The experiment results reveal that the angles of asperity of the stamper 4 and the thin film 3 are substantially coincident with each other in the case where the angle of asperity of the stamper 4 is 60 degrees or less. Thus, the asperity pattern is accurately transferred.

As mentioned above, the asperity pattern formed on the thin film 3 matches the asperity pattern of the stamper 4. With this arrangement, signals are read accurately without causing unnecessary diffuse reflection of laser light incident from the side of the protective layer 5. Generally, as the thickness of a metallic thin film is increased, the asperity pattern on the upper surface of the metallic thin film does not exactly match the asperity pattern of the layer underneath the metallic thin film, as seen in the conventional art. According to this embodiment of the present invention, however, since the asperity pattern is transferred after formation of the thin film 3, there is no likelihood that a thick metallic film obstructs the formation of an asperity pattern having a sharp edge portion. This arrangement enables an optimum asperity configuration depending on the asperity pattern of the stamper 4 to thereby facilitate signal optimization.

In this embodiment, the thin film 3 is directly formed on the substrate 1, and transfer of the asperity pattern is carried out by directly pressing the stamper 4 having the asperity pattern against the thin film 3. The present invention is not limited to this arrangement. As an altered form, a layer that is not subjected to thermal deformation may be interposed between the substrate 1 and the thin film 3.

Third Embodiment

In the first and second embodiments, an asperity pattern corresponding to information signals is transferred to the thin film by pressing the stamper against the thin film or a like layer that has been laminated on the substrate in a certain order. In this embodiment, an arrangement is described in which a substrate is fabricated by injection molding, and simultaneously, an asperity pattern is transferred to a thin film.

Figure 5:
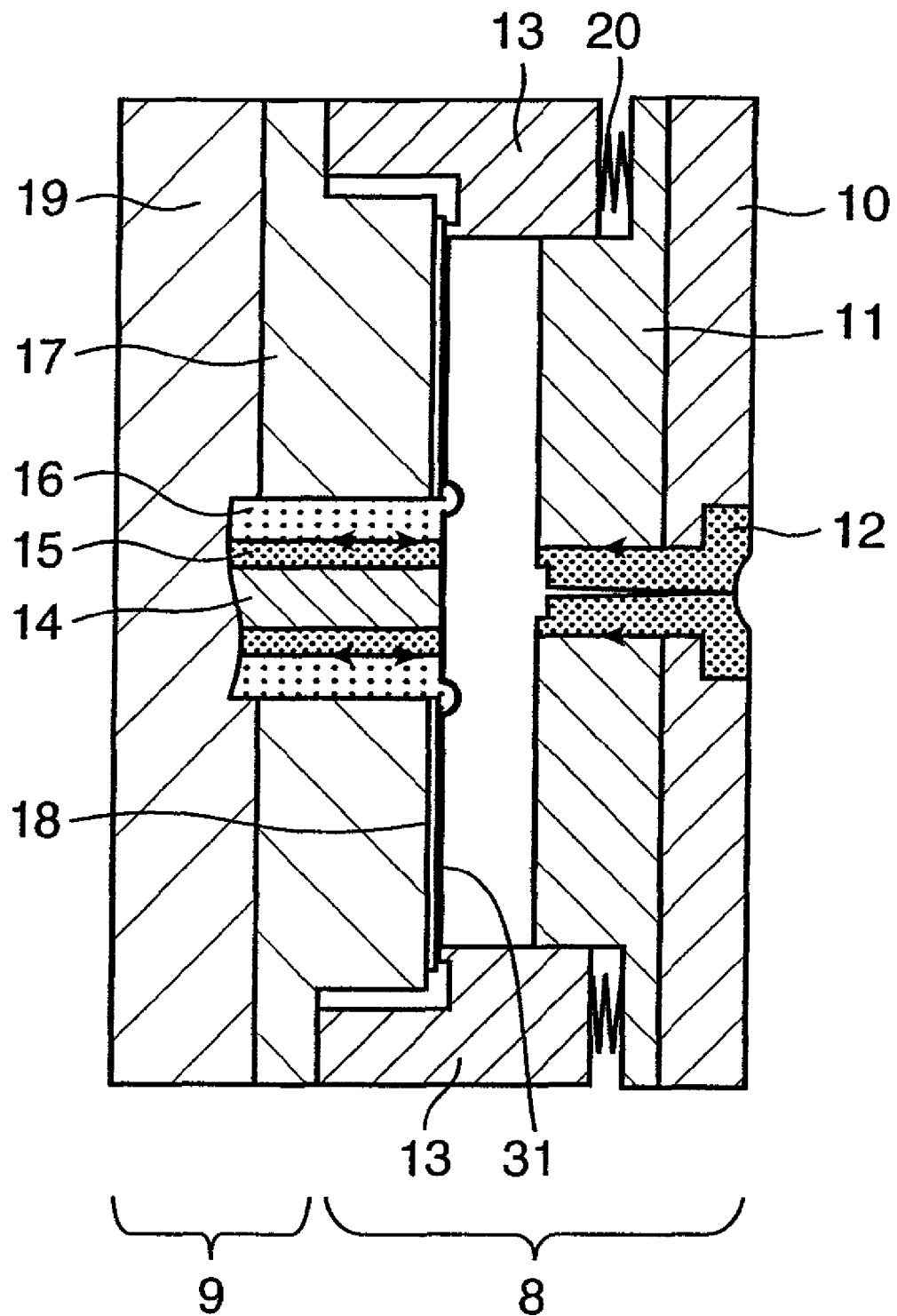
FIG. 5 is a cross-sectional view of a die assembly used in an optical disk production method in accordance with a third embodiment of the present invention.

FIG. 5 is an elevational cross-sectional view of a die assembly used in an optical disk production method in accordance with a third embodiment of the present invention. The die assembly has a substantially cylindrical shape with its center of axis of rotation horizontally aligned in the plane of FIG. 5. Referring to FIG. 5, the die assembly comprises a fixed die 8 and a movable die 9. The fixed die 8 is fixedly supported on a molding machine (not shown) according to a known method. FIG. 5 shows a state in which the fixed die 8 engages with the movable die 9 by way of springs 20.

The fixed die 8 has a fixed-side base block 10 and a fixed-side mirror finished block 11 facing the base block 10. The base block 10 is a member to be fastened to the molding machine by a screw or a like element. The surface of the mirror finished block 11 opposite to the base block 10 is mirror-finished to facilitate flow of the molten resin. If, however, there is no need of providing a light incident plane on the side of the substrate, it is not required to form the mirror-finished surface on the mirror finished block 11.

A sprue bush 12 is attached to a central part of the base block 10 and the mirror finished block 11. The sprue bush 12 has a hole through which a molten resin is to be injected. The molten resin is injected into the cavity of the die assembly through the sprue bush 12. Outer ring 13 is mounted on the outer side of the mirror finished block 11 in the plane of FIG. 5 to define the outer diameter of a molded substrate produced by injection molding of the molten resin. The outer ring 13 is pressed against the movable die 9 from the side of the fixed die 8 by the springs 20. The fixed die 8 has such a construction that air is blown into the cavity through the clearance defined by the sprue bush 12 and the mirror finished block 11, as shown by the leftward arrows in FIG. 5.

The movable die 9 has a movable-side base block 19 and a movable-side mirror finished block 17 facing the base block 19. The base block 19 is a member to be fastened to the molding machine by a screw or a like element. The surface of the mirror finished block 17 opposite to the base block 19 is mirror-finished. A cut-punch 14, an ejector 15, and a stamper holder 16 are arranged one over the other at the center of the base block 19 and the mirror finished block 17, from the center of axis of the die assembly radially outwardly in this order. The outer periphery of the stamper holder 16 is in contact with the mirror finished block 17. A stamper 18 having an asperity pattern corresponding to information signals is firmly pressed against the mirror-finished surface of the mirror finished block 17 (inner side of the die assembly) with the asperity pattern facing the cavity of the die assembly. The cut-punch 14 is adapted to form a hole in the disk by projecting in a certain direction after charging of the resin. The ejector 15 is adapted to detach the disk from the die by projecting in a certain direction after charging of the resin. The stamper holder 16 is adapted to fix the inner periphery of the stamper 18 to the mirror finished block 17. The stamper 18 is fixed by the outer ring 13 with a clearance defined by the stamper 18 and the outer ring 13 for gas release.

The movable die 9 has a construction such that air is blown in and out of the cavity of the die assembly through the clearance defined by the ejector 15 and the stamper holder 16, as shown by the leftward-and-rightward arrows in FIG. 5. A thermostatic water channel (not shown) is formed in each of the fixed-side base block 10 and the movable-side mirror finished block 17 to set the temperature of the die assembly constant.

A circular sheet 31 having a diameter smaller than the inner diameter of the cavity corresponding to the inner diameter of the outer ring 13 in FIG. 5 is firmly pressed by the surface of the stamper 18 corresponding to the inner side of the die assembly, with the air inside the cavity being drawn out therefrom through the clearance between the ejector 15 and the stamper holder 16 by vacuum attraction in the direction shown by the leftward arrows in FIG. 5. The outer diameter of the sheet 31 is set smaller than the inner diameter of the cavity to secure gas release in charging the molten resin into the cavity to thereby produce defect-free optical disks in terms of external appearance.

The sheet 31 includes at least a resin layer 32 and a thin film 33. In the case where an optical disk to be produced is a DVD of reproducible type, the thin film 33 of the sheet 31 consists of a reflective metal layer. In the case where an optical disk to be produced is a DVD of recordable or rewritable type, the thin film 33 comprises multiple layers including a recording layer and a reflective metal layer to satisfy signal characteristics of the disk.

Figure 6A:
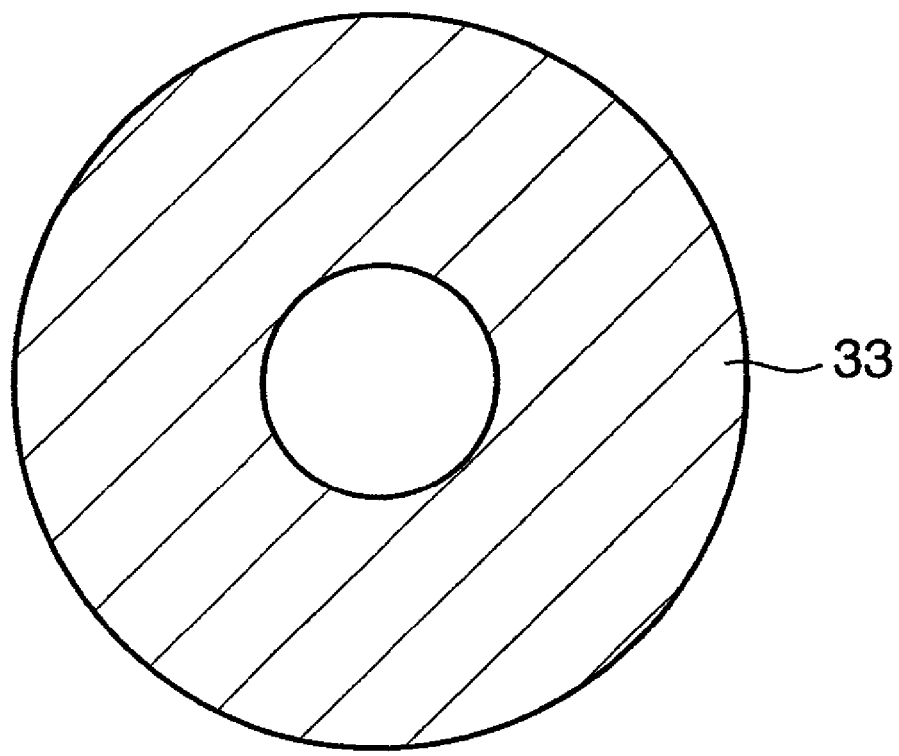
FIGS. 6A and 6B are a plan view and a side view, respectively, showing a resin sheet used in the optical disk production method in accordance with the third embodiment of the present invention.
Figure 6B:
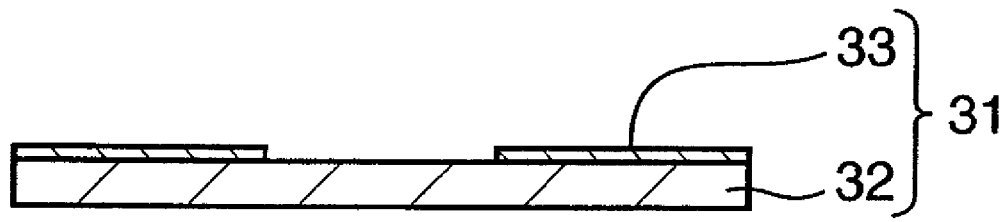

FIGS. 6A and 6B are a plan view and a side view, respectively, showing a resin sheet used in the optical disk production method in accordance with the third embodiment of the present invention. As shown in FIG. 6B, a hole is not formed in the central part of the resin layer 32, whereas a hole is formed in the central part of the thin film 33. Non-formation of the thin film 33 in the central part of the disk is to secure firm contact of the resin layer 32 with a protective layer at the central part of the disk.

In this embodiment, the sheet 31 is fixedly supported in the cavity with the thin film 33 of the sheet 31 firmly contacted with the stamper 18. The asperity pattern of the stamper 18 has a configuration such that the track pitch is 0.35 µm, and the asperity pit has a height or depth of 70 nm. The sheet 31 has a thickness of 10 µm. The resin layer 32 is made of a polycarbonate resin. The thin film 33 is made of aluminum with 50 nm in thickness.

The die assembly having the above construction is operated in such a manner that a molten polycarbonate resin is injected into the cavity through the sprue bush 12 under the injection conditions of resin temperature: 380° C., die temperature: 130° C., screw diameter: 25 mm, maximum injection rate: 200 mm/s, and tact time: 10 sec. Upon lapse of 0.1 to 0.2 second after charging of the resin into the cavity, the stamper 18 reaches its highest temperature. It is desirable that the sheet 31 is pressed against the charged resin with a maximum pressure at this moment. It is confirmed that when the pressure for pressing the stamper 18 against the sheet 31 reaches 150 MPa or higher, the asperity pattern of the stamper 18 is accurately transferred to the thin film 33.

Before charging of the resin, the sheet 31 is not formed with a hole. After charging of the resin, a hole is formed in the central part of the sheet 31 by projecting the cut-punch 14 in the certain direction, simultaneously with formation of the resin layer 32. The disk (molded product) produced by the aforementioned process has a configuration of 15 mm in inner diameter, 120 mm in outer diameter, and 1.1 mm in thickness. Non-formation of the hole in the center of the sheet 31 is to keep the molten resin from intruding in a clearance between the sheet 31 and the stamper 18 during charging of the resin.

It is desirable to locate the stamper 18 on the side of the movable die 9, as shown in FIG. 5 for several reasons. One reason is that since the molten resin is injected through the sprue bush 12 mounted on the fixed die 8, the injected resin exerts a force to press the sheet 31 against the stamper 18. Another reason is that the substrate is stably detached from the stamper 18 and unloaded from the die assembly after the fixed die 8 and the movable die 9 have been moved away from each other to open the cavity.

The vacuum attraction of the sheet 31 is continued until immediately after the charging of the molten resin is completed. After the vacuum attraction is suspended, air is blow out from the die assembly in unloading the molded substrate from the die assembly. Switching between vacuum attraction and air blowout is implemented by a switching control between a vacuum attraction circuit and an air blow circuit by actuating a solenoid valve.

It is desirable to make the material of the molten resin to be injected and the material of the resin layer 32 identical to each other, as shown in this embodiment. In such a case, the material may be an acrylic resin, a polycarbonate resin, or a polyolefin resin. Using the same material for the molten resin and the resin layer 32 is advantageous in forming a boundary in good condition without causing phase separation or a like drawback. As a result, the pressure distribution on the surface of the thin film facing the resin sheet is substantially uniform, which makes it possible to carry out effective press-contact. Thus, the asperity pattern of the stamper is accurately transferred to the thin film.

In this embodiment, the thin film 33 on the sheet 31 is a single metal layer. Alternatively, the thin film 33 may be a multiple layers including a reflective metal layer and a recording layer.

Transfer characteristics of the optical disks were examined by changing the angle of asperity of the stamper 18 while retaining the other conditions unchanged. The experiment results reveal that the angles of asperity of the stamper 18 and the thin film 33 are substantially coincident with each other in the case where the angle of asperity of the stamper 18 is 70 degrees or less. Thus, the asperity pattern is accurately transferred.

As mentioned above, the asperity pattern formed on the upper surface of the thin film 33 matches the asperity pattern of the stamper 18. With this arrangement, signals are read accurately without causing unnecessary diffuse reflection of laser light incident from the side of the protective layer. Generally, as the thickness of a metallic thin film is increased, the asperity pattern on the upper surface of the metallic thin film does not exactly match the asperity pattern of the layer underneath the metallic thin film, as seen in the conventional art. According to this embodiment of the present invention, however, since the asperity pattern is transferred after formation of the thin film 33, there is no likelihood that a thick metal film obstructs formation of an asperity pattern having a sharp edge portion. This arrangement enables an optimum asperity configuration depending on the asperity pattern of the stamper 18 to thereby facilitate signal optimization.

In this embodiment, the sheet 31 comprises the thin film 33 to be firmly pressed by the stamper 18, and the resin layer 32, with the thin film 33 serving as a reflective layer. Alternatively, a metal foil 30 made of a single metal element may be used, in place of the sheet 31.

In this embodiment, the thin film 33 is made of aluminum. Alternatively, the metal foil 30 and the thin film 33 each may be made of a material having high ductility. The requirements regarding the metal foil 30 and the thin film 33 in this embodiment are the same as those regarding the thin film 3 in the first embodiment.

Fourth Embodiment

In the foregoing embodiments, cases are described in each of which the thin film 3 comprises a single layer. An arrangement is also practically employed in which the thin film 3 comprises more than one layer in order to increase the recording capacity of optical disks. In this embodiment, a case is described where the thin film 3 comprises a double layer.

Figure 7A:
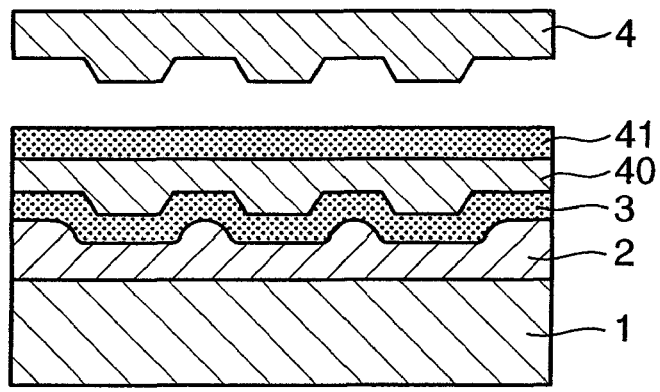
FIGS. 7A through 7C are illustrations schematically showing an optical disk production method in accordance with a fourth embodiment of the present invention.
Figure 7B:
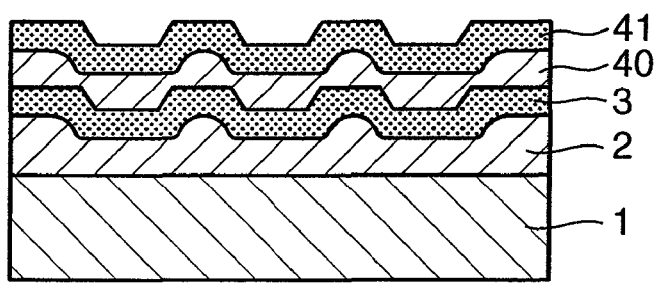
Figure 7C:
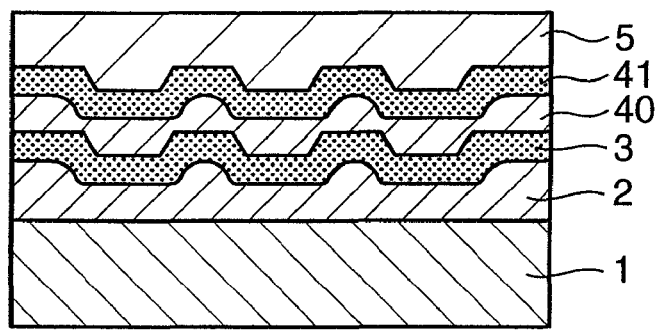
Figure 8A:
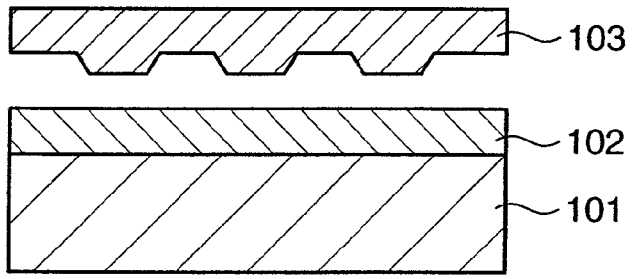
FIGS. 8A through 8D are illustrations showing a conventional optical disk production method.
Figure 8B:
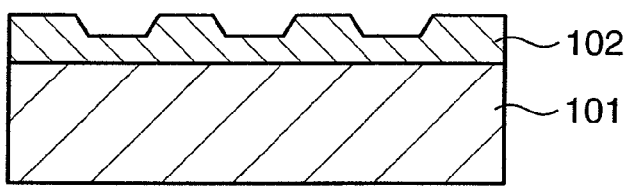
Figure 8C:
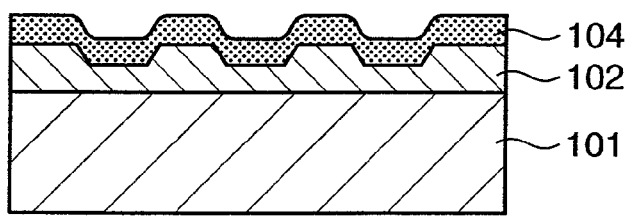
Figure 8D:
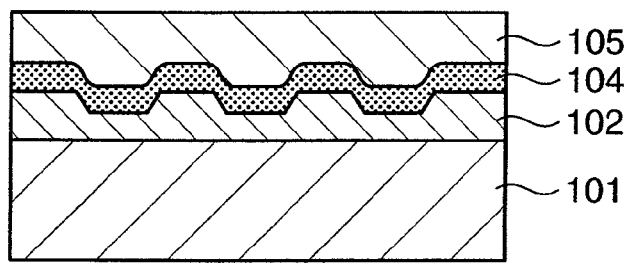

FIGS. 7A through 7C are illustrations schematically showing a process of an optical disk production method in accordance with a fourth embodiment of the present invention. Referring to FIG. 7A, a first thermoplastic resin layer 2 and a first thin film 3 are formed one over the other in this order on a substrate 1. This arrangement is identical to that in the first embodiment, as shown in FIG. 1B. In the fourth embodiment, a second thermoplastic resin layer 40 is additionally formed on the first thin film 3. The second thermoplastic resin layer 40 is attached to the first thin film 3 by bonding a transparent sheet made of a polycarbonate resin on the first thin film 3 with an adhesive. Then, a second thin film 41 made of silver and having a thickness of 50 nm is deposited on the second thermoplastic resin layer 40 by sputtering. A stamper 4 having an asperity pattern (track pitch: 0.35 µm, height or depth of asperity pit: 70 nm) corresponding to information signals is opposingly arranged above the second thin film 41 (see FIG. 7A).

In the above state, the stamper 4 heated to 120° C. is pressed against the second thin film 41 with a surface pressure of 50 MPa. At this time, it is desirable to apply vacuum attraction to a clearance defined by the second thin film 41 and the stamper 4 to keep air bubbles from intruding in the clearance. This arrangement prevents gas intrusion to thereby effectively carry out the pressing. As a result of the pressing, as shown in FIG. 7B, the asperity pattern of the stamper 4 is accurately transferred onto the second thin film 41. Then, a protective layer 5 equivalent to the protective layer 5 in the first embodiment is placed on the second thin film 41, as shown in FIG. 7C, whereby an optical disk having the two thin films (reflective layer) is fabricated.

In this embodiment, the second thin film 41 (reflective layer) is formed on the substrate produced by the method in accordance with the first embodiment. Alternatively, the second thermoplastic resin layer 40 and the second thin film 41 may be formed on the substrate produced in accordance with the second or third embodiment.

In this embodiment, the second thin film 41 is deposited by sputtering. As an alternative, vacuum deposition other than sputtering may be applied. In the case where the optical disk to be produced is of reproducible type (DVD-ROM), the second thin film 41 consists of a reflective metal layer. In the case where the optical disk to be produced is of recordable or rewritable type (DVD-RAM), the second thin film 41 comprises multiple layers including a recording layer and a reflective metal layer. Three or more transfer layers can be formed by cyclically repeating the steps as described in this embodiment.

Similarly to the first through third embodiments, the asperity patterns formed on the first thin film 3 and the second thin film 41 match the asperity pattern of the stamper 4. With this arrangement, signals are read accurately without causing unnecessary diffuse reflection of laser light incident from the side of the protective layer 5. Generally, as the thickness of a metallic thin film is increased, the asperity pattern on the upper surface of the metallic thin film does not exactly match the asperity pattern of the layer underneath the metallic thin film, as seen in the conventional art. According to this embodiment of the present invention, however, since the asperity pattern is transferred after formation of the first thin film 3 and the second thin film 41, there is no likelihood that a thick metal film obstructs formation of an asperity pattern having a sharp edge portion. This arrangement enables an optimum asperity configuration depending on the asperity pattern of the stamper 4 to thereby facilitate signal optimization.

In this embodiment, the first thin film 3 and the second thin film 41 each are made of silver. Alternatively, a material having high ductility is usable as the material for the first thin film 3 and the second thin film 41. The requirements regarding the first thin film 3 and the second thin film 41 are the same as those regarding the thin film 3 in the first embodiment.

As mentioned above, the optical disk production methods of the foregoing embodiments produce optical disks having a light-transmissive protective layer of about 0.1 mm in thickness, and a reflective layer formed with an asperity capable of reproducing information signals with high fidelity. Use of the inventive optical disks makes it possible to perform accurate signal reading. Furthermore, since the optimum asperity pattern of the optical disks can be determined based on the asperity pattern of the stamper, signal optimization is easy. In this way, the optical disks produced by this production method satisfy the requirements for the forthcoming high density recording.

This application is based on Japanese Patent Application No. 2003-286652 filed on Aug. 5, 2003, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for producing optical disks constructed such that laser light is irradiated on a side of the disk opposite to a substrate in information reading, the method comprising:
   directly and firmly contacting a stamper having an asperity pattern thereon with a sheet member having a thin film on a surface of the sheet member facing the stamper, the thin film including at least a reflective metal layer, the stamper being fixedly supported in a cavity of a die assembly, and the sheet member being supported in the cavity of the die assembly; and
   forming a substrate on a side of the sheet member opposite the reflective metal layer and transferring the asperity pattern of the stamper to the reflective metal layer by injecting a molten resin into the cavity of the die assembly by injection molding after the directly and firmly contacting the stamper with the sheet member.

2. The method according to claim 1, wherein at least a center or its vicinity of the sheet member is attracted toward the stamper by vacuum attraction during the injection molding.

3. The method according to claim 1,
   wherein the sheet member includes a resin sheet, the resin sheet having a resin layer and at least the reflective metal layer formed on the resin layer, the resin layer having a continuous plane over its entirety, and
   wherein the method further comprises forming a hole in a central part of the disk after charging of the molten resin into the cavity of the die assembly.

4. The method according to claim 3, wherein the reflective metal layer is formed on the resin sheet other than the central part of the resin sheet.

5. The method according to claim 3, wherein the molten resin forming the substrate is the same kind of resin as the resin layer of the resin sheet.

6. The method according to claim 1, wherein the sheet member has an outer diameter smaller than an inner diameter of the cavity of the die assembly.

7. The method according to claim 1, wherein the stamper is disposed opposing a hole of the die assembly through which the molten resin is injected.

8. The method according to claim 1, wherein the reflective metal layer includes a metal film containing at least one selected from Au, Ag, Cu, Pt, and Al in the content of 95 wt % or more.

9. The method according to claim 1,
   wherein the thin film includes a layer other than the reflective metal layer, and
   wherein the reflective metal layer is formed on a side of the thin film opposite to the stamper.

10. The method according to claim 1,
    wherein a thermoplastic resin layer is formed on the sheet member,
    wherein the thin film including at least the reflective metal layer is formed on the thermoplastic resin layer, and
    wherein the stamper having the asperity pattern thereon is directly heat-pressed against the thin film to transfer the asperity pattern to the reflective metal layer.

11. The method according to claim 1, wherein the sheet member has a transparent sheet or a light transmissive layer made of a UV curing resin formed thereon.

* * * * *